(12) United States Patent
Vasseur et al.

(10) Patent No.: US 9,065,750 B2
(45) Date of Patent: Jun. 23, 2015

(54) CONGESTION-BASED NOTIFICATION DURING FAST REROUTE OPERATIONS IN STATEFUL PATH COMPUTATION ELEMENT ENVIRONMENTS

(75) Inventors: Jean-Philippe Vasseur, Saint Martin d'Uriage (FR); Stefano Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 13/524,135

(22) Filed: Jun. 15, 2012

(65) Prior Publication Data

US 2013/0336116 A1    Dec. 19, 2013

(51) Int. Cl.
| | |
|---|---|
| *H04J 3/14* | (2006.01) |
| *G06F 11/00* | (2006.01) |
| *H04L 12/729* | (2013.01) |
| *H04L 12/707* | (2013.01) |
| *H04L 12/703* | (2013.01) |
| *H04L 12/801* | (2013.01) |
| *H04L 12/911* | (2013.01) |

(52) U.S. Cl.
CPC .............. *H04L 45/125* (2013.01); *H04L 45/22* (2013.01); *H04L 45/28* (2013.01); *H04L 47/11* (2013.01); *H04L 47/825* (2013.01)

(58) Field of Classification Search
USPC .......................... 370/235, 229, 230; 455/403
See application file for complete search history.

(56) References Cited

U.S. PATENT DOCUMENTS

| | | | |
|---|---|---|---|
| 5,912,877 A * | 6/1999 | Shirai ........................... 370/219 |
| 7,493,383 B1 | 2/2009 | Mukerji | |
| 7,668,971 B2 | 2/2010 | Vasseur et al. | |
| 7,801,030 B1 | 9/2010 | Aggarwal et al. | |
| 7,864,669 B2 | 1/2011 | Bonaventure et al. | |
| 7,886,079 B2 | 2/2011 | Vasseur et al. | |
| 7,920,466 B2 | 4/2011 | Vasseur | |
| 8,040,797 B2 | 10/2011 | Vasseur et al. | |
| 8,072,879 B2 | 12/2011 | Vasseur et al. | |
| 8,260,922 B1 | 9/2012 | Aggarwal et al. | |
| 8,279,749 B2 | 10/2012 | Vasseur et al. | |
| 8,355,315 B2 | 1/2013 | Vasseur et al. | |
| 2004/0246939 A1 * | 12/2004 | Koskiahde ..................... 370/351 |
| 2005/0281192 A1 | 12/2005 | Nadeau et al. | |

(Continued)

FOREIGN PATENT DOCUMENTS

EP    2530892 A1    12/2012

OTHER PUBLICATIONS

Crabbe, et al., "PCEP Extensions for Stateful PCE", IETF Trust, Network Working Group, Internet Draft, draft-ietf-pce-stateful-pce-00, Feb. 2012, 52 pages.

(Continued)

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron

(57) ABSTRACT

In one embodiment, once activation of use of a backup tunnel is detected for a primary tunnel, then a level of congestion of the path of the backup tunnel may be determined. In response to the level being greater than a threshold, a head-end node of the primary tunnel is triggered to reroute the primary tunnel (e.g., requesting to a path computation element). Conversely, in response to the level not being greater than the threshold, the backup tunnel is allowed to remain activated.

13 Claims, 9 Drawing Sheets

(56) References Cited

U.S. PATENT DOCUMENTS

2006/0198308 A1* 9/2006 Vasseur .................. 370/238
2007/0183317 A1* 8/2007 Vasseur et al. ............ 370/225
2011/0110226 A1* 5/2011 Lu et al. .................. 370/228

OTHER PUBLICATIONS

Farrel, et al., "A Path Computation Element (PCE)-Based Architecture", The Internet Society, Network Working Group, Request for Comments 4655, Aug. 2006, 41 pages.

Pan, et al., "Fast Reroute Extensions to RSVP-TE for LSP Tunnels", The Internet Society, Network Working Group, Request for Comments 4090, May 2005, 39 pages.

Vasseur, et al., "Path Computation Element (PCE) Communication Protocol (PCEP)", IETF Trust, Network Working Group, Request for Comments 5440, Mar. 2009, 87 pages.

Cipolla, et al., "Notification of Transmittal of the International Search Report and the Written Opinion of t he International Searching Authority, or the Declaration", Patent Cooperation Treaty, International Appl. No. PCT/US2013/045899, mailed Dec. 6, 2013, 12 pages, Eurpopean Patent Office, Rijswijk, Netherlands.

* cited by examiner

CONGESTION-BASED NOTIFICATION DURING FAST REROUTE OPERATIONS IN STATEFUL PATH COMPUTATION ELEMENT ENVIRONMENTS

TECHNICAL FIELD

The present disclosure relates generally to computer networks, and, more particularly, to path computation elements (PCEs).

BACKGROUND

Tunnels have been used for a number of applications such as the support of virtual private networks (VPNs) or Traffic Engineering following source routed paths hop-by-hop. Among the number of tunneling techniques developed over the past decade, multiprotocol label switching (MPLS) Traffic Engineering (TE) has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure.

Path computation elements (PCEs), as defined, for example, in the Internet Engineering Task Force's Request for Comment (RFC) 4655, generally consist of relying on an external engine (PCE) responsible for the computation of tunnels in the network. Head-ends (or Path Computation Clients—PCCs) send requests to PCEs (PCReq messages) using the PCEP signaling protocol (RFC 5440), and receive computed paths thanks to replies (PCRep messages). PCEP also specifies notification and error messages. PCEs have been used mostly for back-up tunnel path computation and inter-domain (Inter-area/AS) path computations where per-domain path computation was the only (potentially very sub-optimal) technique available prior to the PCE.

PCE-based networks deployed so far have been stateless. That is, tunnels were computed by the PCE according to the Traffic Engineering Database (TED) fed in most cases by the routing protocol without requiring any state maintenance. However, for certain applications, stateful PCE may provide a more optimal solution. A new stateful PCE draft has been adopted as an IETF Working Document, entitled "PCEP Extensions for Stateful PCE"<draft-ietf-pce-stateful-pce> by Crabbe et al., and which specifies several new PCEP messages, allowing PCCs to update the PCE on their tunnel states (PCRpt messages), control tunnel delegation (ability for the PCE to remotely control a tunnel) and for the PCE to send tunnel requests to PCCs to learn states (PCUpd messages). Stateful PCE architectures, however, still present a number of challenges of various natures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, once activation of use of a backup tunnel is detected for a primary tunnel, then a level of congestion of the path along a backup tunnel may be determined. In response to the level being greater than a threshold, a head-end node of the primary tunnel is triggered to reroute the primary tunnel (e.g., requesting to a path computation element). Conversely, in response to the level not being greater than the threshold, the backup tunnel is allowed to remain activated (traffic is locally rerouted onto the backup tunnel).

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
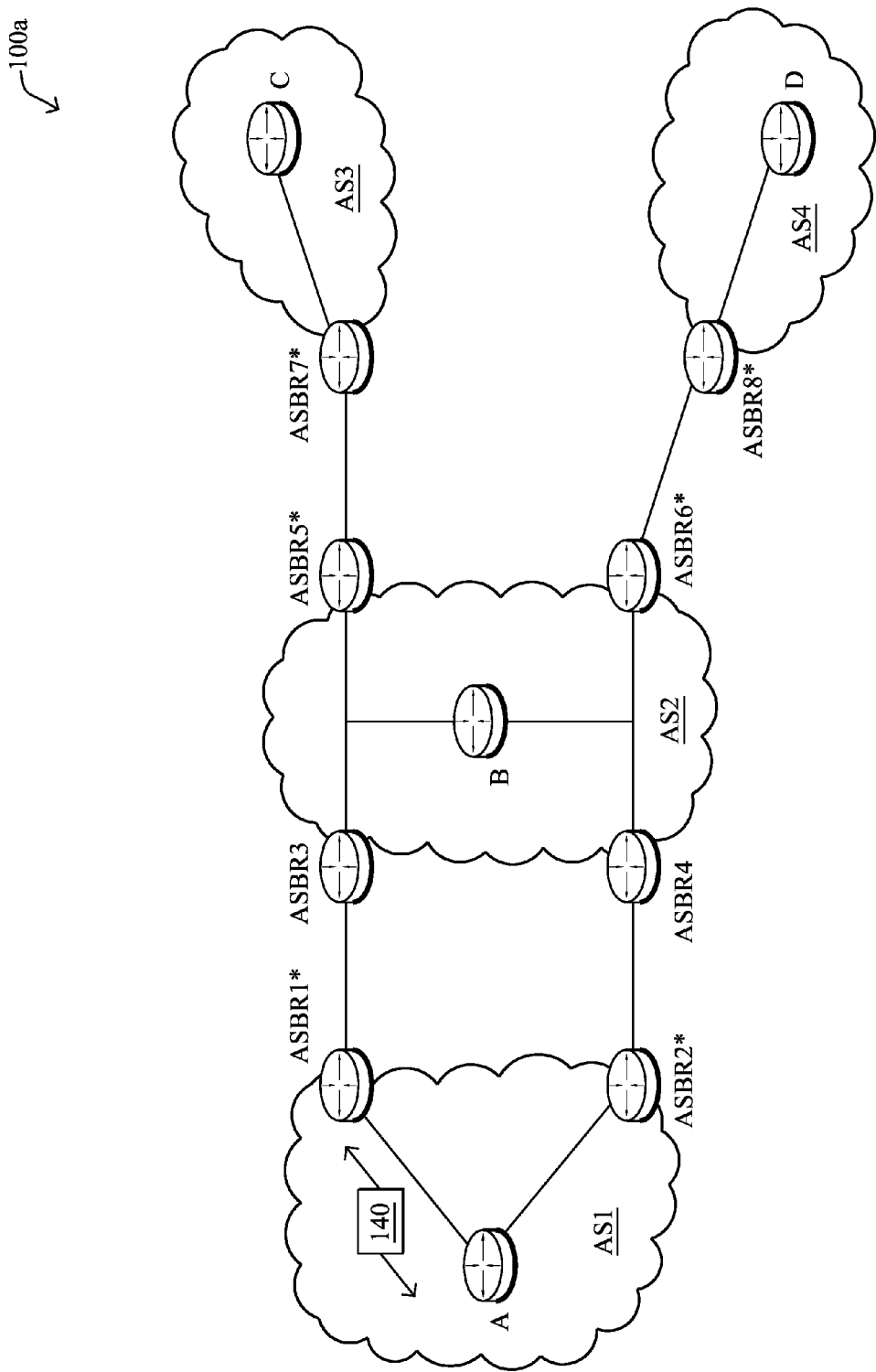
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS 1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
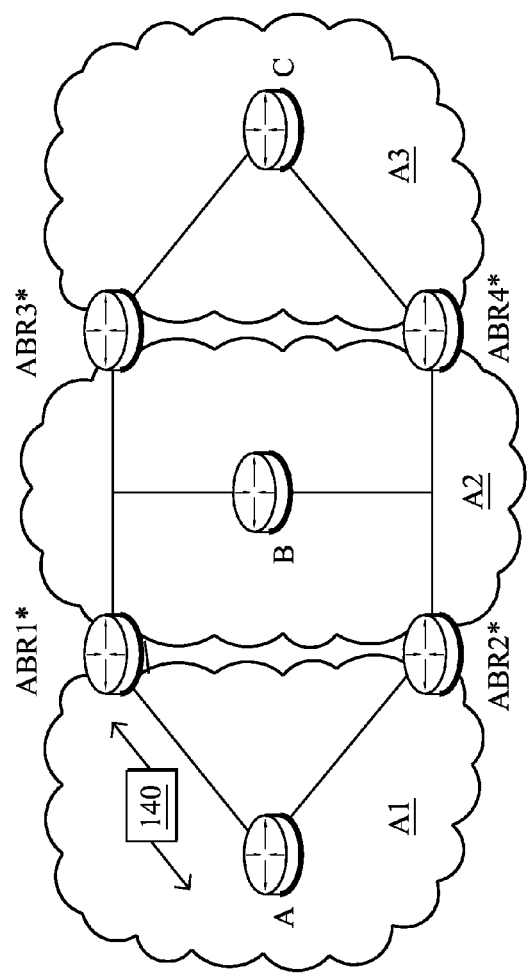

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
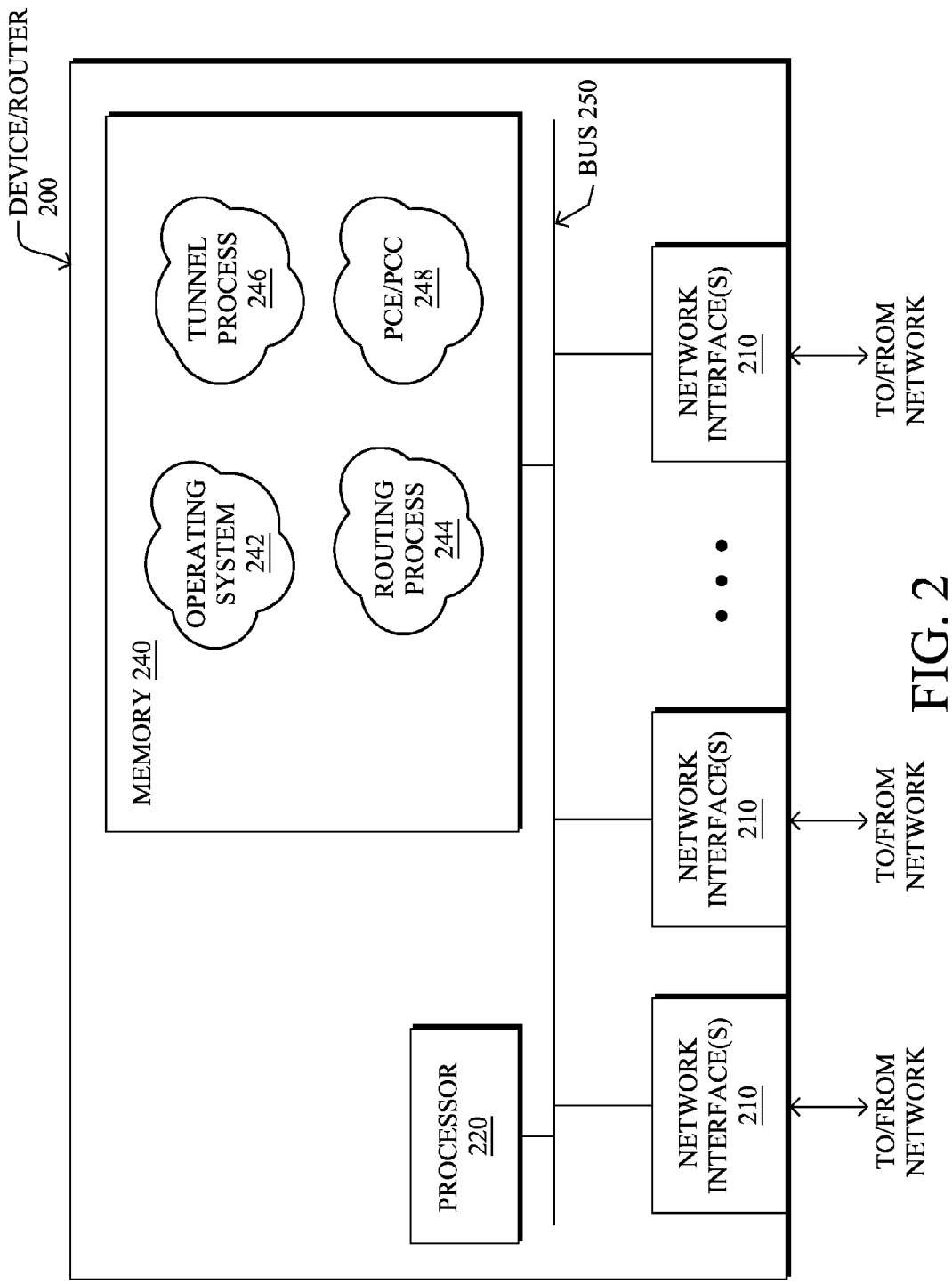
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, tunneling process/services 246, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very suboptimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

Figure 3A:
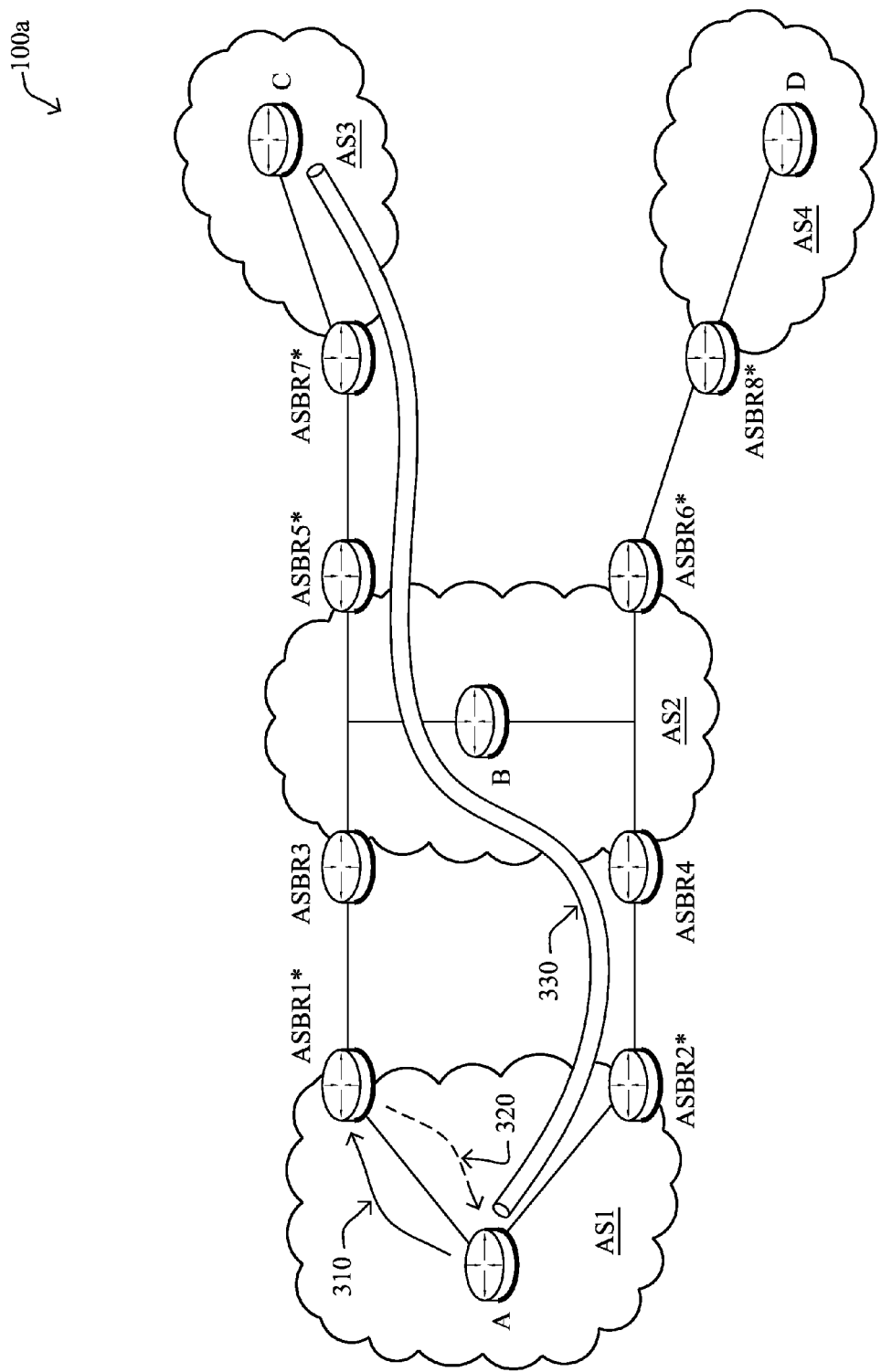
FIGS. 3A-3B illustrate examples of PCE-based tunnel computation in the networks of FIGS. 1A-1B.
Figure 3B:
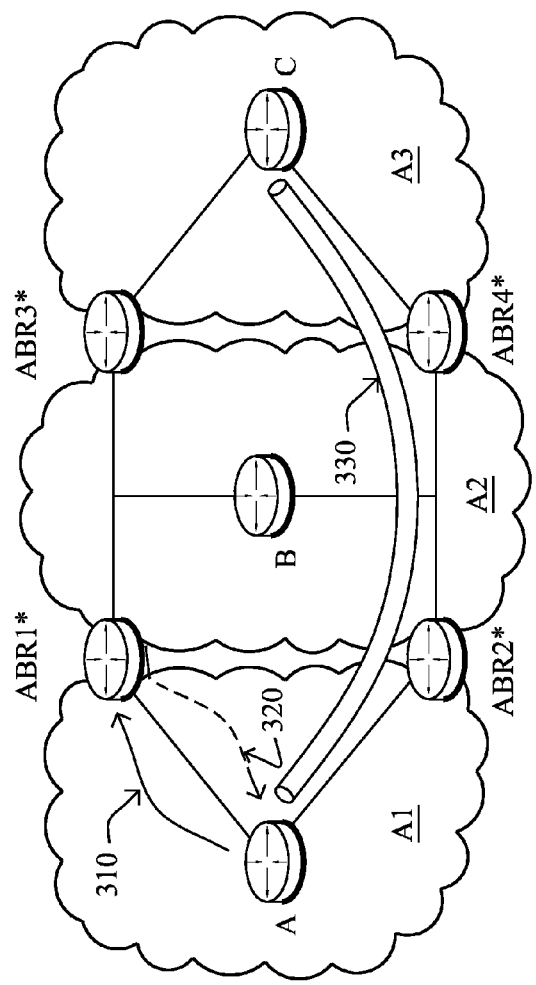

FIGS. 3A-3B illustrate simple examples of PCE-based tunnel computation in the networks 100a and 100b of FIGS. 1A-1B, respectively. In particular, assume in each instance that LSR A, acting as a PCC, requests, from a local PCE (e.g., ASBR1* or ABR1*, respectively), a tunnel to LSR C. The path computation request 310 results in computation of the path, and a path computation response 320 is returned to the head-end LSR A. The tunnel 330 may then be established, accordingly. (Note that for inter-domain computation, the local PCE may act as a PCC to other PCEs in other domains, as mentioned above.) Note further that while PCEs are particularly useful for inter-domain path computation, the techniques herein are not limited to inter-domain path computation, and may, in fact, be used for intra-domain path computation as well.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

As mentioned above, one of the major challenges of stateful PCE lies in the signaling churn and state maintenance in the network, which may be a critical limiting factor of such an architecture. It is not rare for such networks to make use of MPLS TE Fast Reroute (FRR), where backup tunnels are pre-provisioned in the network in case of link/node/SRLG (shared risk link group) failure, where upon network element failure, head-ends are notified by the PLR (Point of Local Repair) thanks to an RSVP Path Error message, which subsequently triggers a PCReq message followed by PCEP PCUpd message. In large scale deployed network a single link failure may affect several thousands (and in some cases tens of thousands) of LSPs, leading to a massive burst of messages sent to the PCE. Such a spike of messages to the PCE may lead to long processing delays but also improper LSP rerouting and reoptimization. Indeed, state reservation is not always tied to the actual traffic activity. LSPs are sized for N MBits/s and cannot be resized in real-time in order to avoid too many LSP reroutes and signaling churns.

As of today, with existing techniques, a brute force link/node failure notification of the PCE would lead to recomputing all affected LSPs and massively rerouting all affected LSPs regardless of the actual necessity to reroute such LSPs (according to the actual network load).

Congestion-Based Notification During Fast Reroute

The techniques herein propose a set of techniques to avoid sending new path computation requests to reoptimize FRR-protected tunnels when not required, and thus reducing signaling churn for PCEs that may affect their scalability. In particular, a triggered mechanism may dynamically determine the level of congestion of a backup tunnel path after FRR local reroute so as to determine the set of impacted head-ends that must immediately send a path computation request to a stateful PCE for reroute. In other words, upon local rerouting to a back-up tunnel, a notification may be sent to the head-end of the affected tunnel if and only if the back-up tunnel path is congested, thus significantly limiting the number of new path computation requests to the PCE, consequently increasing the scalability of a centralized PCE architecture.

Specifically, according to one or more embodiments of the disclosure as described in detail below, once activation of use of a backup tunnel is detected for a primary tunnel, then a level of congestion of the backup tunnel path may be determined. In response to the level being greater than a threshold, a head-end node of the primary tunnel is notified and triggered to reroute the primary tunnel (e.g., requesting to a path computation element). Conversely, in response to the level not being greater than the threshold, the backup tunnel is allowed to remain activated.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly. Notably, in this instance, a non-PCE/PCC device, e.g., an LSR, may also be configured to operate according to an illustrative PCE/PCC process 248, e.g., to notify the PCE of congestion as described herein.

Figure 4:
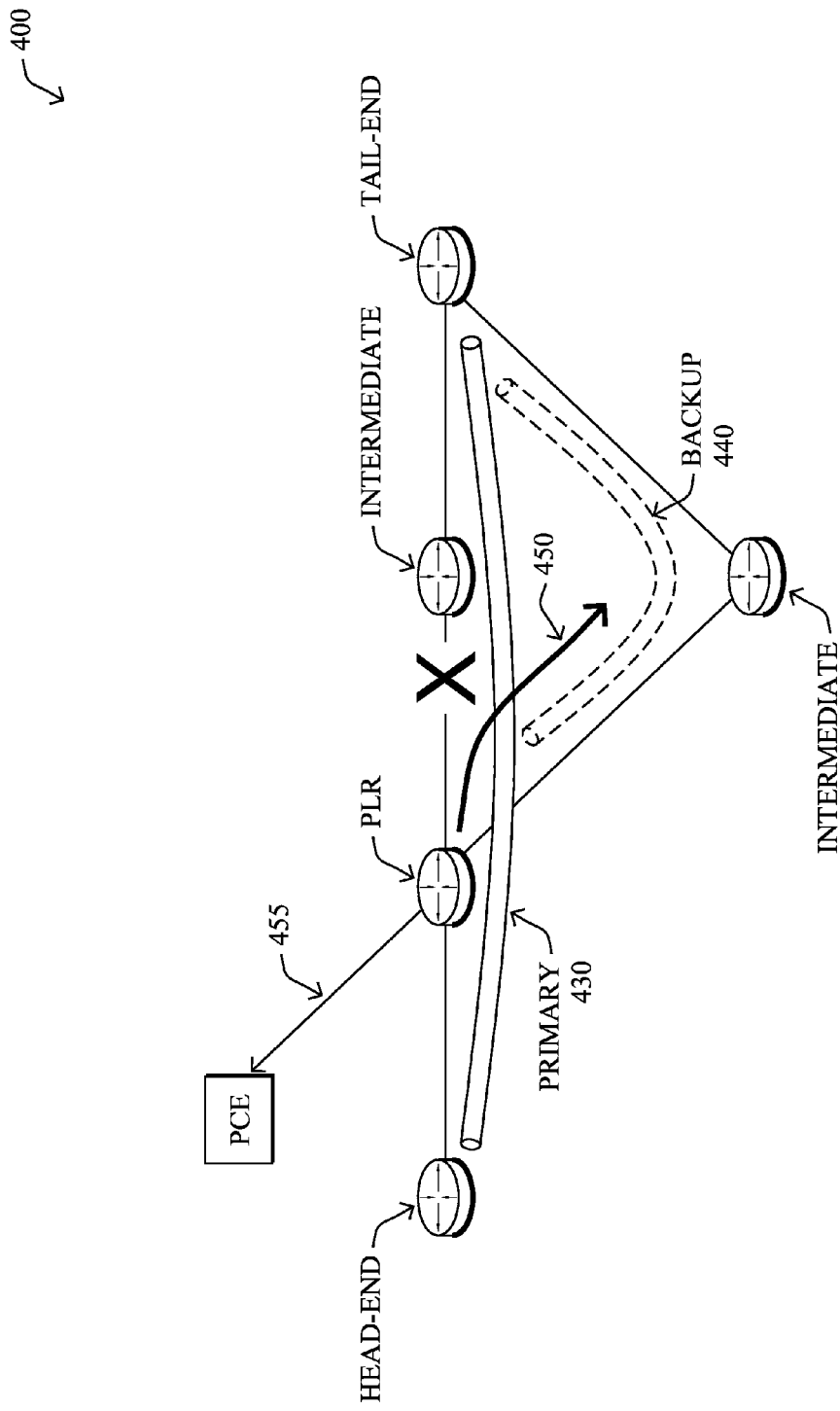
FIG. 4 illustrates an example of backup tunnel activation.

Operationally, as shown in FIG. 4, upon detecting a network element failure (link/node/SRLG), a point of local repair (PLR), i.e., a head-end of the backup tunnel 440, first signals (e.g., via RSVP-TE or other messages 450) the local reroute to each head-end of affected primary tunnels 430. Certain embodiments herein augment this mechanism by specifying a failure notification message 455 also sent by the PLR to the PCE, so that it starts a pre-computation of affected LSPs as a safety measure. Such a message could either be a PCEP messages (e.g., flagged with a high priority thanks to the DHCP) or a unicast IPv6 message. Such a message 455 may be more specific than a conventional IGP update in the event an IGP update is used for these notifications. That is, the PLR may capitalize on the existing failure notification mechanism though enhance its scope as described herein. For example, the dominant cause of "failures" at the IP layer are actual maintenance events either at the IP operator level or at the dense wavelength division multiplexing (DWDM) level. Thanks to GMPLS inter-layer communication, this means that in all the cases of maintenance (intra- or inter-layer), the node that needs to regenerate a tunnel due to a "failure" (derived from a maintenance) actually knows much more than what it floods. For example, if a link L is part of a shared risk link group (SRLG) SRLG1, and the maintenance involves an optical node responsible for SRLG1, then current IGP floods only the failure of L. The techniques herein, however, may extend IGP flooding with additional information describing the cause of the failure (e.g. "the reason for L going down is the loss of the optical node"). This way any node within the link-state topology (including the PCE server) learns all the available information and hence can perform a better computation (e.g., avoiding mis-computation due to incomplete data, unsuccessful signaling, and "crankback").

Upon detecting the network element failure, that is, upon triggering (detecting) activation of use of a backup tunnel for a primary tunnel, for each tunnel affected by the failure and optionally only those signaled as a stateful LSP (S-LSP=TE LSPs computed by a stateful PCE), the PLR (or head-end node if aware of the failure) may arm a local timer T1, during which time a level of congestion of the backup tunnel can be determined. In particular, the backup path (the path of the backup tunnel) may be actively monitored by adding a newly specified TLV illustratively called the "CONG-TLV" to the backup tunnel RSVP-TE Path messages 450 until the expiration of T1. Note that in certain embodiments, the messages 450 during T1 may be sent at a higher frequency than during normal refresh (e.g., greater than 45 s with 15 s jitter).

Figure 5:
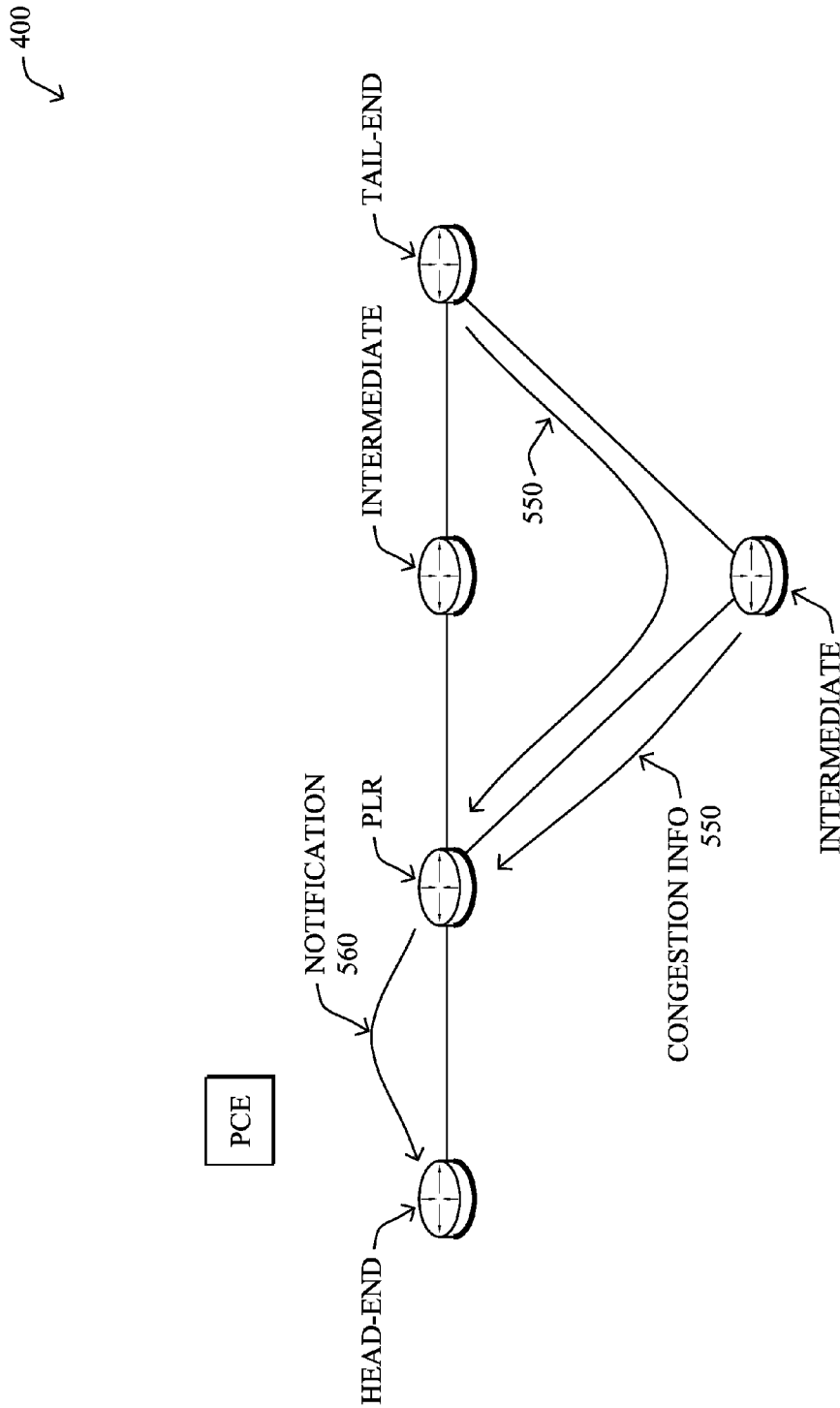
FIG. 5 illustrates an example of congestion-based notification.
Figure 6:
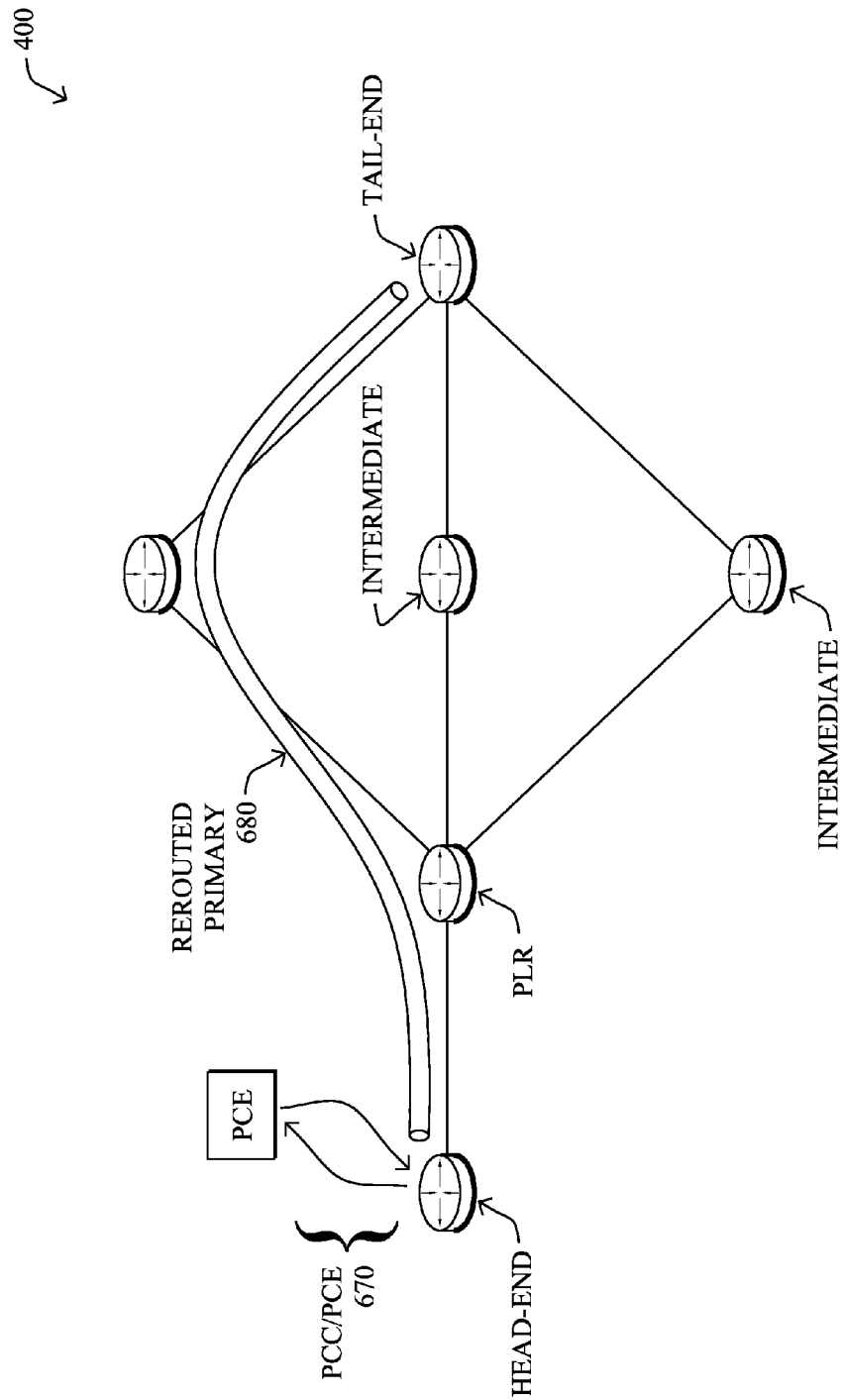
FIG. 6 illustrates an example of primary tunnel rerouting.

In one or more embodiments, these path messages 450 may be sent as a request for congestion information to the nodes along the backup tunnel, such that each node along the backup path detecting the presence of the CONG-TLV (congestion TLV) gathers local statistic of the active queues and/or percentage of link utilization so as to dynamically compute the level of congestion. As shown in FIG. 5, the nodes along the backup tunnel may report the result back to the PLR by adding the CONG-TLV to the RSVP-TE Resv messages 550 sent upstream. Note that even in case where a PCE computes a traffic matrix, it may not precisely know the level of congestion according to the traffic matrix (traffic demand) with a high granularity as would be afforded by the congestion information messages 550.

At this point, the PLR may inspect the set of CONG-TLVs recording the level of congestion on each traversed link along the backup path due to the primary traffic being routed along those links but also the rerouted traffic (on the backup tunnel 440) because of the network failure. If the PLR determines that the level of congestion (e.g., pre-configured on the node, dynamically checked against a policy-based configuration of SLA for the said traffic) exceeds some threshold, a notification may be sent to the head-end of the rerouted tunnel so as to trigger a path computation request to a PCE. In other words, in response to the congestion level being greater than the threshold, the head-end node of the primary tunnel is triggered to reroute the primary tunnel, accordingly. Otherwise no notification need be sent to the head-end, which dramatically reduces the traffic churn of the stateful PCE, thus (in response to the level not being greater than the threshold), the backup tunnel is allowed to remain activated.

Note that the notion of a congestion threshold (e.g., being "overloaded") may be defined according to policy, link type, etc., and one can associate different grades of alarm to the induced signaling to the PCE server. As an example, overload could be defined relative to the overall load on the link (total link utilization) reaching 80%, 90% or 100% of the link capacity. It could also be defined in terms of the amount of rerouted traffic (link utilization for backup tunnels) present on the link (20%, 30%, 40%). Other thresholds may be defined, and those mentioned herein are merely examples.

According to one or more alternative embodiments herein, the PLR may send a notification to the head-end including the level of congestion along the backup path (load of all links, load of the most loaded link, etc.) in which case the head-end may decide itself whether to request a tunnel reroute according to the level of congestion observed along the back-up path. That is, the PLR may transmit the level of congestion to the head-end node of the primary tunnel regardless of the level, and then the head-end node may determine whether the level is greater than the threshold, as mentioned above.

As mentioned above, in another embodiments, the stateful PCE may pre-compute a rerouted primary tunnel in anticipation of congestion of the backup tunnel. That is, in one particular embodiments, the stateful PCE, upon receiving the set of failure notification(s), may decide to trigger the computation of a new path for all affected tunnels, such as in response to the number, size, and criticality of these tunnels meet specific criteria. In this instance, new paths could be provided proactively to all head-ends of the affected tunnels, even without any request from these head-ends. By pre-computing new paths of the affected primary tunnels, this allows the PCE to save time, should it receive a request for these tunnels at some point in the future.

Figure 7:
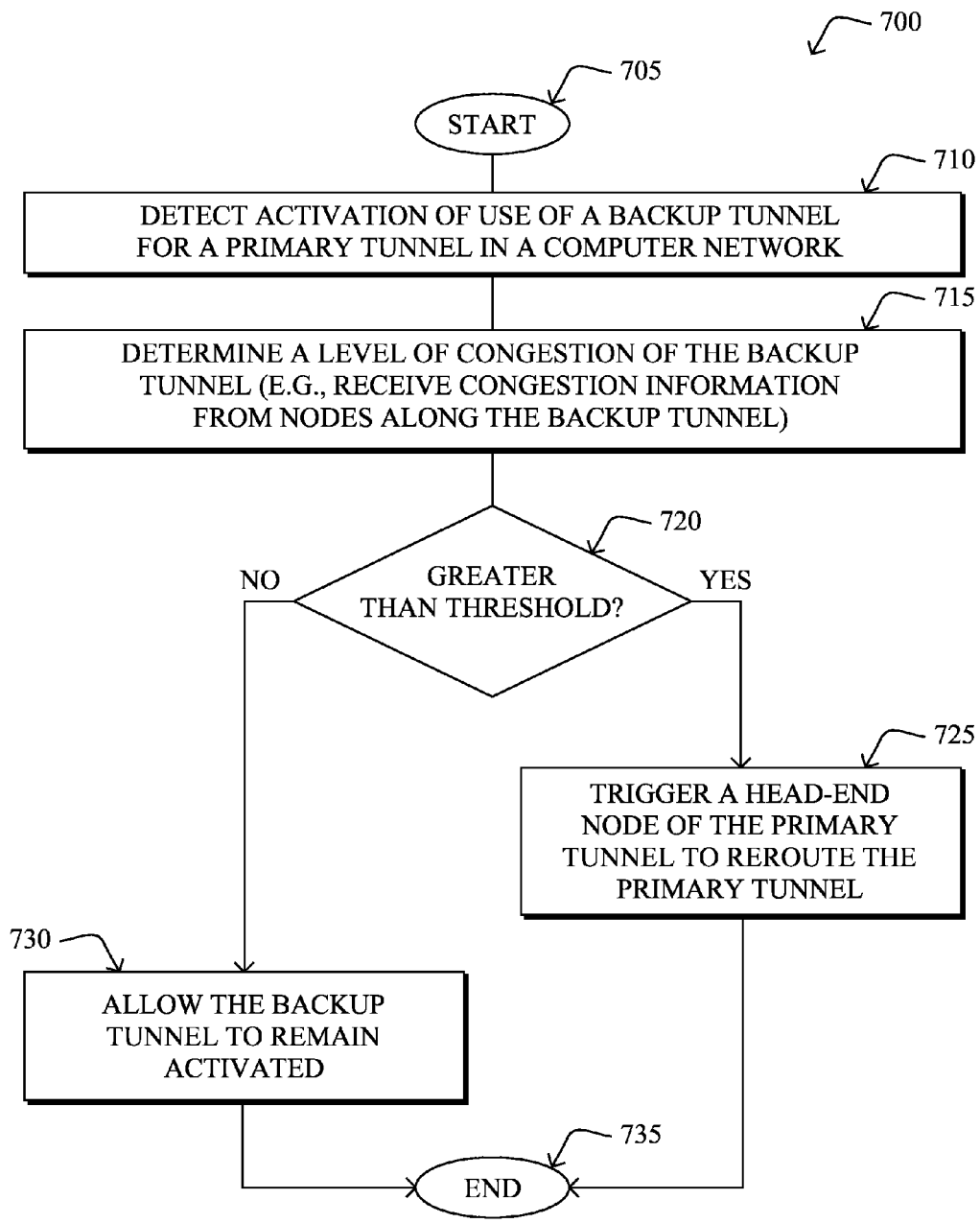
FIG. 7 illustrates an example simplified procedure for congestion-based notification during fast reroute operations in stateful PCE environments.

FIG. 7 illustrates an example simplified procedure 700 for congestion-based notification during fast reroute operations in stateful PCE environments in accordance with one or more embodiments described herein. The procedure 700 may start at step 705, and continues to step 710, where, as described in greater detail above, a device (e.g., either the head-end node or point of local repair) detects activation of use of a backup tunnel 440 for a primary tunnel 430 in a computer network. In response, in step 715 the device determines a level of congestion of the backup tunnel (e.g., receiving congestion information from nodes along the backup tunnel). If the congestion is greater than a threshold in step 720, then in step 725 the device may trigger a head-end node of the primary tunnel (e.g., sending a notification or else triggering itself) to reroute the primary tunnel. Otherwise, if there is not an amount of congestion that surpasses the threshold in step 720, the device allows the backup tunnel to remain activated in step 730. The procedure 700 ends in step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for congestion-based notification during fast reroute operations in stateful PCE environments. In particular, one of the major limiting factors of stateful PCE architectures lies in their scalability, especially their ability to handle large signaling churn, not just in terms of computing capability but even more so for the number of maintained states required when rerouting/re-optimizing a large number of tunnels. The techniques herein, however, limit path computation requests for rerouted tunnels for only those paths that are considered to be congested, thus reducing the number of these requests, accordingly.

While there have been shown and described illustrative embodiments that provide enhanced operation for stateful PCE architectures, it is to be understood that various other adaptations and modifications may be made within the spirit and scope of the embodiments herein. For example, the embodiments have been shown and described herein with relation to MPLS TE-LSPs and other various protocols. However, the embodiments in their broader sense are not as limited, and may, in fact, be used with any function for which a PCE may be responsible, such as other types of tunnels, other types of path computation, etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, at a point of local repair (PLR), activation of use of a backup tunnel for a primary tunnel in a computer network;
   determining at the PLR whether a level of congestion of a path of the backup tunnel is greater than a threshold, wherein the threshold is when the path of the backup tunnel would be considered overloaded due to link utilization;
   sending a congestion notification to a stateful path computation element (PCE) to cause the PCE to start pre-computing a rerouted primary tunnel;
   in response to the PLR determining that the level is greater than the threshold, sending a reroute notification to a head-end node of the primary tunnel to reroute the primary tunnel, wherein the head-end node is a PCE client that communicates with the PCE; and
   in response to the PLR determining that the level is not greater than the threshold, allowing the backup tunnel to remain activated without sending the reroute notification to reroute the primary tunnel to the head end node.

2. The method as in claim 1, wherein a stateful path computation element (PCE) pre-computes a rerouted primary tunnel path in anticipation of congestion of the backup tunnel.

3. The method as in claim 1, further comprising:
   receiving congestion information from nodes along the backup tunnel.

4. The method as in claim 3, further comprising:
   sending a request for congestion information to the nodes along the backup tunnel.

5. The method as in claim 1, wherein the threshold is based on total link utilization.

6. The method as in claim 1, wherein the threshold is based on link utilization for backup tunnels.

7. An apparatus, comprising:
   one or more network interfaces to communicate within a computer network;
   a processor coupled to the network interfaces and adapted to execute one or more processes; and
   a memory configured to store a process executable by the processor, the process when executed operable to:
   detect activation of use of a backup tunnel for a primary tunnel in a computer network;

determine whether a level of congestion of a path of the backup tunnel is greater than a threshold, wherein the threshold is when the path of the backup tunnel would be considered overloaded due to link utilization;

send a congestion notification to a stateful path computation element (PCE) to cause the PCE to pre-compute a rerouted primary tunnel;

send a reroute notification to a head-end node of the primary tunnel to reroute the primary tunnel in response to determining that the level is greater than the threshold, wherein the head-end node is a PCE client that communicates with the PCE; and allow the backup tunnel to remain activated in response to the level not being greater than the threshold without sending the reroute notification to reroute the primary tunnel to the head end node, wherein the apparatus is a point of local repair.

8. The apparatus as in claim 7, wherein a stateful path computation element (PCE) pre-computes a rerouted primary tunnel in anticipation of congestion of the backup tunnel.

9. The apparatus as in claim 7, wherein the process when executed is further operable to:

receive congestion information from nodes along the backup tunnel.

10. The apparatus as in claim 9, wherein the process when executed is further operable to:

send a request for congestion information to the nodes along the backup tunnel.

11. The apparatus as in claim 7, wherein the threshold is based on total link utilization.

12. The apparatus as in claim 7, wherein the threshold is based on link utilization for backup tunnels.

13. A tangible, non-transitory, computer-readable media having software encoded thereon, the software when executed by a processor operable to:

detect activation of use of a backup tunnel for a primary tunnel in a computer network;

determine, by a point of local repair (PLR), whether a level of congestion of a path of the backup tunnel is greater than a threshold, wherein the threshold is when the path of the backup tunnel would be considered overloaded due to link utilization;

send, by the PLR, a congestion notification to a stateful path computation element (PCE) to cause the PCE to pre-compute a rerouted primary tunnel;

send, by the PLR, a reroute notification to a head-end node of the primary tunnel to reroute the primary tunnel in response to determining that the level is greater than the threshold, wherein the head-end node is a PCE client that communicates with the PCE; and allow, by the PLR, the backup tunnel to remain activated in response to the level not being greater than the threshold without sending the reroute notification to reroute the primary tunnel to the head end node.

\* \* \* \* \*